United States Patent
Kloskowski et al.

(10) Patent No.: US 11,720,767 B2
(45) Date of Patent: Aug. 8, 2023

(54) METHOD FOR CONTROLLING A DECORATIVE PRINTING PROCESS

(71) Applicant: Felix Schoeller GmbH & Co. KG, Osnabrück (DE)

(72) Inventors: Michael Kloskowski, Bramsche (DE); Knut Hornig, Ladbergen (DE); Christopher Altenburg, Osnabrück (DE); Rijk van der Zwan, Bad Iburg (DE); Mathias Lauxtermann, Osnabrück (DE)

(73) Assignee: Felix Schoeller GmbH & Co. KG, Osnabrück (DE)

( * ) Notice: Subject to any disclaimer, the term of this patent is extended or adjusted under 35 U.S.C. 154(b) by 0 days.

(21) Appl. No.: 17/996,361

(22) PCT Filed: Apr. 9, 2021

(86) PCT No.: PCT/EP2021/059286
§ 371 (c)(1),
(2) Date: Oct. 17, 2022

(87) PCT Pub. No.: WO2021/209333
PCT Pub. Date: Oct. 21, 2021

(65) Prior Publication Data
US 2023/0131182 A1    Apr. 27, 2023

(30) Foreign Application Priority Data
Apr. 17, 2020   (EP) .................................... 20170041

(51) Int. Cl.
*G06K 15/02* (2006.01)
*G06K 15/12* (2006.01)

(52) U.S. Cl.
CPC ......... *G06K 15/025* (2013.01); *G06K 15/129* (2013.01)

(58) Field of Classification Search
CPC ........................... G06K 15/025; G06K 15/129
See application file for complete search history.

(56) References Cited

U.S. PATENT DOCUMENTS

| 5,851,684 A | 12/1998 | Matscheko et al. |
| 5,885,719 A | 3/1999 | Perrin |

(Continued)

FOREIGN PATENT DOCUMENTS

| DE | 3741368 | 12/1988 |
| DE | 10 2005 015506 | 10/2006 |

(Continued)

OTHER PUBLICATIONS

International Search Report for PCT/EP2021/059286 dated Mar. 22, 2022. (German Language).

(Continued)

*Primary Examiner* — Ted W Barnes
(74) *Attorney, Agent, or Firm* — Honigman LLP; Andrew N. Weber; Jonathan P. O'Brien

(57) ABSTRACT

The application relates to a method for controlling a printing process for printing a decorative target image on a substrate, comprising providing the decorative target image to be printed in the printing process by at least one decorative parameter data set, simulating the printing process in a simulation step based on the decorative parameter data set, at least one printing process parameter data set and stored historical printing data sets, such that a digital decorative image is generated, verifying the generated digital decorative image based on the decorative target image to be printed and at least one verification criterion, and if the verification criterion is met, outputting the printing process parameter data set used in the simulation step for performing the printing process.

13 Claims, 3 Drawing Sheets

(56) References Cited

U.S. PATENT DOCUMENTS

Figure 1:
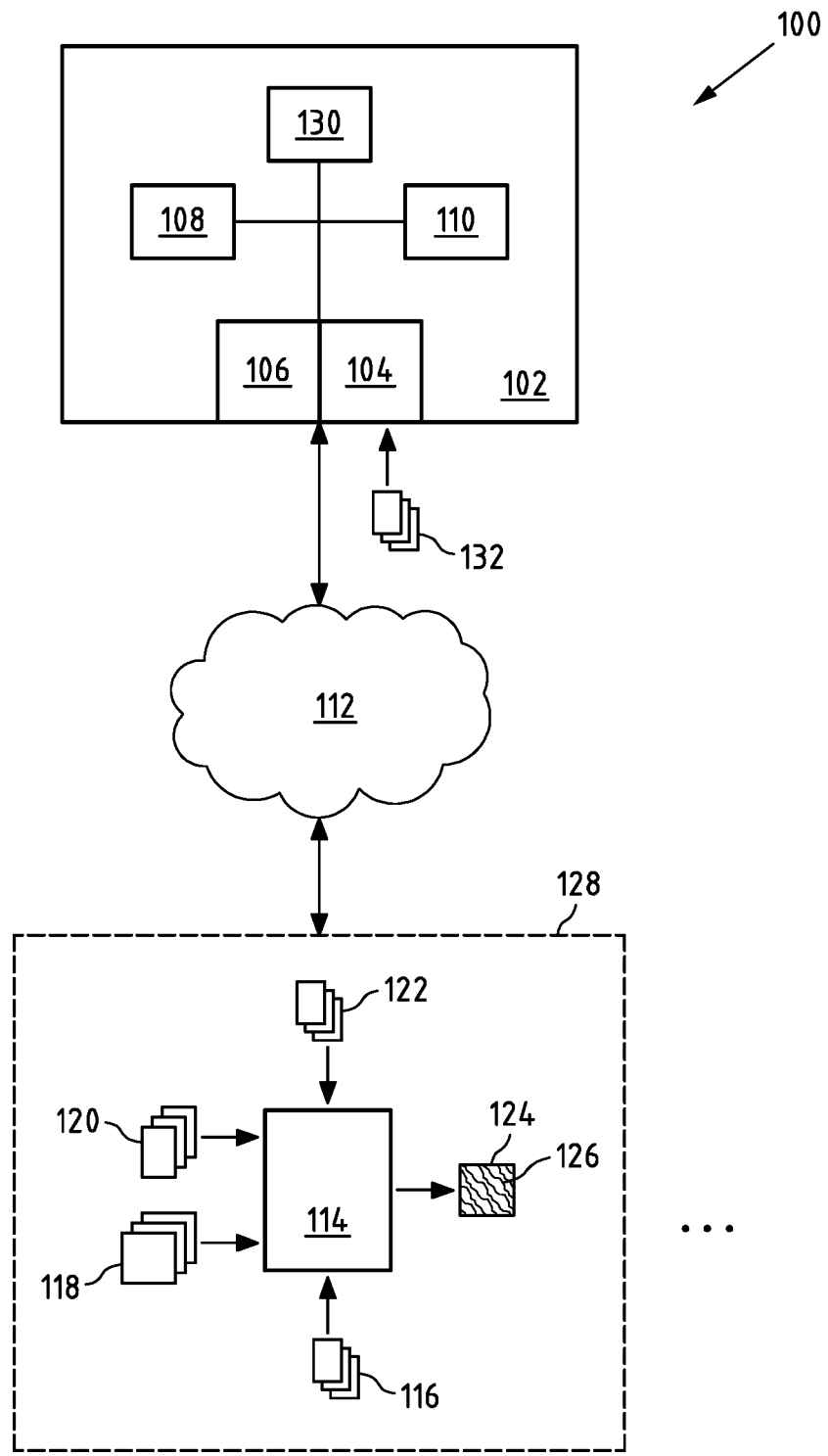

| | | | |
|---|---|---|---|
| 5,955,203 A | 9/1999 | Briggs et al. | |
| 5,965,315 A | 10/1999 | Fujii et al. | |
| 6,480,299 B1 * | 11/2002 | Drakopoulos | H04N 1/6033 358/1.9 |
| 6,706,372 B2 | 3/2004 | Schulz et al. | |
| 8,314,979 B2 * | 11/2012 | Mestha | H04N 1/603 358/1.9 |
| 8,349,464 B2 | 1/2013 | Wicher et al. | |
| 10,003,142 B1 | 6/2018 | Lin | |
| 10,136,032 B2 * | 11/2018 | Schmitt | H04N 1/00082 |
| 10,261,456 B2 * | 4/2019 | Schenk | G06K 15/027 |
| 10,265,986 B2 | 4/2019 | Kuhne et al. | |
| 10,569,583 B2 * | 2/2020 | Knabe | B41J 2/2135 |
| 10,632,778 B2 | 4/2020 | Martorana et al. | |
| 2001/0034592 A1 * | 10/2001 | Herman | B23Q 35/12 703/13 |
| 2004/0197591 A1 | 10/2004 | Schnieder et al. | |
| 2006/0250629 A1 * | 11/2006 | Morales | H04N 1/6011 358/1.13 |
| 2008/0229962 A1 | 9/2008 | Warren et al. | |
| 2008/0278744 A1 * | 11/2008 | Marchesotti | H04N 1/603 358/1.15 |
| 2010/0150438 A1 * | 6/2010 | Farrell | H04N 1/6033 382/167 |
| 2016/0009114 A1 | 1/2016 | Leifert et al. | |
| 2017/0305178 A1 | 10/2017 | Kuhne et al. | |
| 2018/0154666 A1 | 6/2018 | Schmidt et al. | |
| 2019/0263164 A1 | 8/2019 | Martorana et al. | |
| 2020/0193249 A1 * | 6/2020 | Matsuzawa | G06N 3/08 |
| 2020/0399835 A1 | 12/2020 | Kloskowski et al. | |
| 2021/0245493 A1 * | 8/2021 | Lehnhoff | H04N 1/6047 |

FOREIGN PATENT DOCUMENTS

| | | | |
|---|---|---|---|
| DE | 10 2005 015746 | 10/2006 | |
| DE | 102005015506 A1 * | 10/2006 | B41F 33/0009 |
| DE | 10 2005 060108 | 6/2007 | |
| DE | 102005060108 A1 * | 6/2007 | B41F 33/0027 |
| DE | 102014116550 | 5/2016 | |
| DE | 102017116550 | 5/2016 | |
| EP | 0906832 | 4/1999 | |
| EP | 2743091 | 6/2014 | |
| EP | 3896953 | 10/2021 | |
| GB | 2425644 A * | 11/2006 | B41F 33/16 |
| JP | H07-96654 | 4/1995 | |
| JP | 2002-292995 | 10/2002 | |
| KR | 20180026827 | 3/2018 | |
| WO | 1996/011301 | 4/1996 | |
| WO | 1997/031036 | 8/1997 | |
| WO | 2000/006392 | 2/2000 | |
| WO | 2007/080377 | 7/2007 | |
| WO | 2016/074671 | 9/2016 | |
| WO | 2016/188976 | 12/2016 | |
| WO | 2018/091179 | 5/2018 | |
| WO | 2021209333 | 10/2021 | |

OTHER PUBLICATIONS

International Search Report for PCT/EP2021/059286 dated Oct. 20, 2022. (English Translation).
European Search Report for EP 19180856.7 dated Jul. 30, 2019.
European Search Report from EP 20170041.6 dated Oct. 28, 2020.
International Search Report for PCT/EP2016/061630 dated Dec. 1, 2016.
International Search Report for PCT/EP2017/074240 dated Dec. 22, 2017.
International Search Report for PCT/EP2021/059286 dated Jun. 23, 2021.
Written Opinion of the International Searching Authority for PCT/EP2016/061630 dated Dec. 1, 2016.
Written Opinion of the International Searching Authority for PCT/EP2017/074240 dated Dec. 22, 2017.

* cited by examiner

METHOD FOR CONTROLLING A DECORATIVE PRINTING PROCESS

CROSS REFERENCE TO RELATED APPLICATION

This U.S. nonprovisional application is the 35 USC § 371 national phase of PCT Application No. PCT/EP2021/059286, filed on Apr. 9, 2021, which claims the benefit of EP Application No. 20170041.6, filed on Apr. 17, 2020. Each of these documents is hereby incorporated by reference in its entirety.

The application relates to a method for controlling a decor printing process for printing a decor onto a substrate, in particular for producing a decor substrate, in particular in the form of a decorative film.

Decorative coating materials (also referred to as decorative substrates), so-called decorative papers or decorative films, are used, for example, for surface coating in furniture manufacturing or in interior design, e.g. for laminate flooring.

In the present context, a decorative foil means in particular a synthetic resin-impregnated or synthetic resin-impregnated and surface-treated as well as printed substrate (preferably paper/decorative paper/decorative raw paper). Decorative films can in turn be applied to a carrier plate, in particular glued or bonded to a carrier plate.

Depending on the type of impregnation process, a distinction can be made between decorative films with a through-impregnated paper core and so-called pre-impregnates, where the paper is only partially impregnated online or offline in the paper machine. Urea glues or polyvinyl acetate (PVAC) glues can be used for gluing a pre-impregnate onto a carrier plate (e.g. a board made of wood-based material, such as particle board or MDF (medium density fibreboard) board). These do not always lead to the desired bonding of the decor substrates.

Furthermore, so-called laminates are known. Laminates can be, for example, high pressure laminates (HPL) or low pressure laminates (LPL), in particular depending on the manufacturing process (HPL process or LPL process).

These are laminates formed by pressing several impregnated sub-substrates (preferably papers) layered on top of each other. The structure of such a high-pressure laminate generally comprises a transparent support sheet (overlay) producing (the highest) surface resistance, a resin-impregnated decorative paper and one or more phenolic resin-coated Kraft paper(s). Hardboards, plywood boards and particle boards, for example, can be used as a support or carrier plate for this purpose.

In the case of laminates (low-pressure laminates) produced according to the so-called short-cycle processes, the decorative raw paper impregnated with synthetic resin is pressed directly with the support, for example a particle board, using low pressure.

The substrate (decorative paper or decorative film) used in the above-mentioned coating materials can be white or coloured, with or without additional printing. With regard to the technical application properties, the substrates used as starting materials, in particular the so-called decorative raw papers, must preferably meet specific requirements. It shall first be noted that a printed substrate is in particular a decorative film and a substrate to be printed is a decorative raw paper/decorative paper. In a special case, a substrate to be printed is also understood to be a decorative raw paper referred to as a pre-impregnated decorative film, wherein in the case of a pre-impregnated decorative film, this is already impregnated with a resin material before printing.

Application properties include, in particular, high opacity for better coverage of the substrate, uniform formation and grammage of the sheet for uniform resin absorption, high light resistance, high purity and uniformity of the colour for good reproducibility of the pattern to be printed, high wet strength for a smooth impregnation process, appropriate absorbency for obtaining the required degree of resin saturation and/or good dry strength, which is important during rewinding processes in the paper machine and/or during printing in the printing machine.

The finishing of substrates, i.e. in particular of material surfaces, can be of an optical nature (through appropriate colouring) and/or of a physical nature (by coating the panel surface with appropriate functionality and/or structure). Decorative substrates can be processed with or without a printed pattern. For this purpose, e.g. the printed or unprinted decorative paper can be impregnated with synthetic resins in one or several stages, then dried—wherein the resin can still remain reactive—and then irreversibly (hot) pressed in sheets or as roll goods with a backing.

The applying of a decor (also called a print pattern) onto a substrate can be done using gravure printing. This printing technique has the advantage of being able to print large quantities of paper at high machine speeds, in particular when producing printed patterns usual in the market. However, gravure printing is not very profitable, in particular for smaller quantities of decorative paper, and is often not good enough in terms of print quality for complicated patterns. From the printing techniques that can withstand the demands for flexibility and quality, the inkjet printing process (also called ink-jet printing process) is therefore becoming increasingly important.

In order to make substrates, in particular in the form of decorative raw papers, printable by the inkjet printing process, these can preferably be coated with one or more functional layer(s) for receiving the printing colour, in particular the ink, and for fixing the dyes. Such decorative raw papers printable by the inkjet printing process are disclosed, for example, in DE 199 16 546 A1 and EP 1 044 822 A1. An example of decorative raw papers that are printable by the inkjet printing process and to which no functional layer is applied is described in EP 295 90 58 A1.

The functional layers, also known as ink-absorbing layers, may contain pigments, water-soluble or water-dispersible polymers as binders, dye-fixing substances and/or other auxiliaries commonly used in such layers.

Substrates in the form of decorative raw papers/decor papers/papers differ in their properties from normal commercially available inkjet papers. Decorative raw papers/decorative papers/papers preferably have a so-called open surface so that they can be impregnated quickly and evenly, in particular with an impregnating resin.

Although a decorative raw paper provided with one of the ink-absorbing layers described above has good ink-jet printability, it has an extensively covered paper structure on at least one side of the paper. The spaces arranged between the fibres are usually largely closed on one side and are therefore only available to a limited extent for the absorption of impregnating resins.

In the prior art the complex interrelationships between substrates to be printed, printing colours and the printing machines executing the printing process are described. These complex interrelationships yield thereto that prior to the printing process, which comprises at least one printing step, a plurality of test printing processes have to be carried out in order to achieve a printed substrate with a desired quality for a specific design to be printed.

In general, substrates and printing colours are used whose quality properties are not completely constant between different production batches. This applies both to the substrates to be printed (in particular in web form), such as decorative raw papers, but also to the printing colours used, such as the inks, and/or a coating applied in a printing machine, such as the primers. Furthermore, the printing machine itself may not be able to be operated completely constantly, for example, due to varying environmental conditions.

Due to the complexity of a printing process and the interrelationships of the aforementioned individual factors, it is unavoidable in the prior art to carry out time-consuming and costly preparatory measures, test runs and/or adjustments when performing a print job and printing process, respectively. As a rule, it is necessary to repeatedly vary settings and print control parameters, respectively, on the printing machine and/or vary the substrate to be used and/or vary the printing colour to be used in order to achieve the desired printing result in accordance with a decor that has been provided, in particular, a decor that has been specified and is to be printed. In particular, a decor to be printed and a decorative target image to be printed, respectively, can be provided by at least one decorative parameter data set.

Since generally the interrelationships, in particular, between the properties of the products used, such as the substrates (and carriers, respectively) and the printing colours as well as the at least one printing machine, are usually only insufficiently known, the adjustment of the parameters is often based on empirical values. The various approaches are therefore based in particular on the experience and knowledge of human users and are therefore often not efficient and reproducible.

It is true that the respective manufacturers of the printing colours used and the substrates to be printed strive to keep the quality as constant as possible, even from different production batches. However, this goal cannot be fully achieved due to the use of natural raw materials in the products, such as minerals (calcium carbonate, titanium dioxide, silicates, etc.) and natural and synthetic polymers (starch, polyvinyl alcohol, etc.).

Furthermore, (relevant) substrate material parameters of the substrates to be printed and print substrates, respectively, and (relevant) printing colour parameters, in particular, of the inks used, may only be partially known, in particular in the gravure printing process, but also in the inkjet process. However, it has been recognised that the substrate material parameters and the printing colour parameters play an important role in the printing process for the quality of the printed decor in combination with the printing machine control parameters.

In the prior art, test samples are produced by press proofs using standard settings on the printing machine with material and time losses and checked in particular with regard to the colour location and/or colour density as well as other quality parameters. In the event of deviations from a target value to be achieved, which may be specified for example in the form of a corresponding criterion, adjustments are made to said parameters. However, it is often not known how, for example, machine control parameters should be set in order to react to the varying qualities of substrates and/or inks.

The same applies to digital printing processes of the prior art. It is true that in the area of decorative substrates and coating materials, respectively, the process can be shortened and losses can be reduced, since a change of setting can generally be made on a digital printing machine with less effort. Nevertheless, the time lost due to the generation of test prints and the adjustment of the printing machine, which is also necessary with digital printing processes, represents a considerable and as yet unsolved challenge. For example, the entire image may have a deviation in one colour direction, or the colour intensity may be too strong or too low, or the overall brightness may be too high or too low. An inkjet printing machine that can be operated in a single-pass or multi-pass process offers in particular a multitude of adjustment possibilities, the optimal setting of which in a prior art printing process has to be determined by a multitude of test prints to be performed before each decor printing process.

Digital printing machines are becoming more widespread in many areas and are replacing more and more the (analogue) printing methods that have been common up to now. Work is being done not only on the hardware but also on the control of the printing process, as described in DE 10 2017 222 327 A1. In this prior art, computers are used to evaluate quality data in the production process and to trigger necessary adjustments in the printing process with a set of rules. However, the parameters of the substrates and/or printing colours used are not taken into account here.

DE 10 2017 207 306 A1 describes in particular a method for monitoring a dyeing standard for a machine processing printing materials by means of a computer. The dyeing standard is composed of different target values and is manually adjusted to the respective job. Printing machine control parameters, for example, are also included in the evaluation by the computer. However, the setting of the colouring standard, which is accessed by the process, is initially done manually and on the basis of the experience of the printer. Thus, in practice, this method also requires a large number of test prints and test printing steps, respectively, to be carried out.

Therefore, the object of the present application is to provide a method for controlling a decor printing process for printing a decor onto a substrate, which has an improved efficiency and in particular reduces the time and costs involved.

This object is solved according to a first aspect of the application by a method for controlling a decor printing process for printing a decorative target image onto a substrate according to claim 1. The method comprises:
 providing the decorative target image to be printed in the printing process by at least one decorative parameter data set,
 simulating the printing process in a simulation step based on the decorative parameter data set, at least one printing process parameter data set and stored historical printing data sets such that a digital decorative image is generated,
 verifying the generated digital decorative image based on the decorative target image to be printed and at least one verification criterion, and
 outputting the printing process parameter data set used in the simulation step to conduct the printing process if the verification criterion is met.

By providing, in contrast to the prior art, a decor printing process in which the decor printing process (hereinafter also referred to as printing process) is simulated, in particular prior to the actual execution of the printing process, the efficiency of the printing process is improved and, in particular, the time and costs are reduced. The necessary preparatory measures for a printing process can be significantly reduced. The number of necessary test prints can at least be reduced, in particular the execution of test printing processes can be completely omitted.

The method is used to control a printing process. In the printing process, a specific and desired, respectively, decor in the form of a decorative target image is printed by a printing machine onto a substrate to be printed (hereinafter also referred to as substrate). For a printing process, a specific printing machine, a specific substrate and a specific printing colour are preferably provided in order to print a specific decorative image with the specific printing colour onto the specific substrate depending on set printing machine control parameters.

In the present application, by a substrate is meant in particular a carrier substrate, preferably a (previously described) decorative raw paper. In the present application, by a printing colour is meant in particular a coloured and colouring liquid which can be applied to the substrate by the printing machine, preferably an (described above) ink. A printing machine can be an analogue or digital decor printing machine, preferably a decor printing machine operating according to the (previously described) inkjet printing method.

The method serves in particular to prepare the (actual) printing process. In particular, the method according to the application serves to determine a printing process parameter data set, wherein the printing process to be conducted is carried out on the basis of the specifications/parameters of the determined printing process parameter data set.

The method can be carried out, in particular, by at least one computing device (with processor, memory means, interfaces, etc.).

At first, a decorative target image to be printed can be provided, in particular predefined, by at least one decorative parameter data set. A decorative target image to be printed is, in particular, an optical pattern to be printed on and onto, respectively, the substrate. Preferably, the decorative target image to be printed can be predetermined in the form of a digital decorative parameter data set (e.g. a corresponding file). In particular, the computing device may have at least one receiving module to receive a decorative parameter data set and thus in particular to provide it.

Optionally, a user interface may be provided to allow a setting and adjusting, respectively, of decor parameters by a user, in particular to allow a setting of a desired visual appearance of the decorative target image to be printed. Preferably, a decorative parameter data set may comprise at least one decor parameter selected from the group comprising colour scheme and optical structure. These parameters may comprise sub-parameters, such as sharpness, contrast, brightness, hue, etc. In particular, the user interface may allow setting of a plurality of decor parameters. The set decor parameters (representing in particular the decorative target image displayable e.g. on a screen of the computing device) may be linked by a decor parameter linking module to a decorative parameter data set.

Based on the provided decorative parameter data set and the desired decorative target image, respectively, a subsequent printing process is simulated in at least one simulation step. In particular, a computing device can have at least one simulation module to which, for example, the decorative parameter data set can be made available by the receiving module.

A printing process is simulated using the decorative parameter data set, a printing process parameter data set and stored historical printing data sets. A printing process parameter data set preferably comprises a plurality of printing process parameters that at least influence a printing process and, in particular, the result of the printing process. A historical data set comprises in particular print data of (actually) executed printing processes. The print data (which may, in particular, comprise the corresponding historical printing process parameter data sets and the respective printed decorative images) have, in particular, been recorded and stored in a database.

Based on this historical printing data, the decorative parameter data set and a specific printing process parameter data set in the simulation step, a printing step is simulated. In this case, the set printing process parameter data set can depend, in particular, on the decorative parameter data set. Due to the historical printing data sets carried out in the past and in particular recorded, the printing result of a printing process and printing step, respectively, of the printing process (which is simulated according to the parameters of the printing process parameter data set) can be simulated (close to reality) in the simulation step.

Simulating means, in particular, that the printing result of a printing process executed according to the printing process parameter data set is predicted. The simulated printing result is a generated digital decorative image.

According to the application, it is provided that the printing result and the generated digital decorative image, respectively, is verified before the printing process parameter data set is used in a simulation step is used in a printing process. The verification is based, in particular, on a verification criterion, the provided decorative target image and to be printed, and the digital decorative image generated in the simulation step. In a variant of the application, the verification can (inherently) take place within the simulation process.

Preferably, a simulation process with a plurality of simulation steps, each with different printing process parameter data sets, is carried out until the digital decorative image generated in a simulation step meets the verification criterion. In particular, in each simulation step, at least one parameter of the printing process parameter data set can be changed compared to the previous simulation step. In particular, the change of a parameter may depend on the verification result.

For example, in the verifying it can be determined whether the simulated printing result has worsened or improved compared to the previous simulated printing result based on the decorative target image to be printed. This can be taken into account the next time a parameter is changed. For example, if an increase in a parameter value is found to have improved the simulated printing result, a further increase can be made in the next simulation step (in case the verification result is not yet fulfilled). If, on the other hand, an increase in a parameter value has worsened the simulated printing result, a reduction can be made in the next simulation step. In a variant of the application, the verifying can (inherently) take place within the simulation process.

If the at least one verification criterion is met by the simulated digital decorative image, an outputting of the printing process parameter data set used in the simulation step occurs for conducting the printing process. For example, a (direct) control of a specific printing machine can occur according to the determined printing process parameter data set.

According to an embodiment of the method according to the application, the printing process parameter data set may comprise a substrate material parameter set and/or a printing colour parameter data set and/or a printing machine control parameter data set. Each of these parameter data sets may preferably have a plurality of corresponding parameters.

The substrate material parameter set may comprise at least one substrate material parameter. A substrate material parameter means, in particular, a parameter describing the quality of the substrate. The at least one substrate material parameter (preferably a plurality is provided) may be selected from the group comprising:
- substrate material type,
- surface properties of the substrate,
- surface structure of the substrate,
- grammage of the substrate,
- porosity of the substrate,
- contents of the substrate (and/or colour acceptance behaviour),
- moisture of the substrate,
- colour of the substrate,
- expansion behaviour of the substrate in relation to further processing (e.g. when used for synchronous pores),
- layer structure of the substrate (e.g. colour-absorbing layer, type and number of functional layers),
- conducted pre-treatment of the substrate.

For example, the sort of substrate and a specific type of substrate, respectively, i.e. a specific substrate to be printed (e.g. a specific type of decorative raw paper), can be indicated. This is particularly advantageous if a number of different types of decorative raw paper are generally available for the printing process.

Alternatively or additionally, statements on the surface structure, surface properties of the substrate, such as the surface energy, the grammage, the ingredients, the layer structure, the porosity, the moisture of the substrate, the colour of the substrate, the stretching behaviour and/or pre-treatments may be given. It shall be understood that the above parameters are only examples and are not exhaustive.

The printing colour parameter data set may include at least one printing colour parameter. A printing colour parameter means, in particular, a parameter describing the quality of the printing colour, in particular, the ink. The at least one printing colour parameter (preferably a plurality is provided) may be selected from the group, comprising:
- printing colour type, in particular ink type,
- type of used colourants (dyes or colour pigments),
- particle size of the colour pigments,
- binder of the printing colour (e.g. water-soluble or water-dispersible polymers as binders),
- additives of the printing colour,
- rheological properties of the printing colour (viscosity),
- colour and colour density, respectively, of the ink as such,
- recipe of the printing colour,
- surface tension.

For example, the printing colour type and a specific printing colour sort, respectively, i.e. a specific printing colour, in particular, ink type, can be specified. This is particularly advantageous if a number of different types of printing colours, in particular, ink types, are basically available for the printing process. Alternatively or additionally, further printing colour parameters can be indicated. It shall be understood that the above parameters are only examples and are not exhaustive.

The printing machine control parameter data set may comprise at least one printing machine control parameter. The at least one printing machine control parameter may be selected from the group, comprising:
- printing machine type,
- printing speed,
- roll pressure,
- web voltage,
- synchronisation of pressure to web speed,
- use of primers (type and quantity and application method and drying),
- drop size of the printing colour to be applied,
- drop frequency,
- drying settings (temperature, radiation intensity, air volume/air speed, etc.),
- electrostatic (charging or discharging).

For example, the type of printing machine, i.e. in particular a specific printing machine, can be specified. This is particularly advantageous if a number of different printing machines are basically available for the printing process.

Alternatively or additionally, the printing machine control parameter data set may comprise at least one parameter adjustable at the printing machine. The parameters can, for example, relate to setting options at a printing head of a (specific) printing machine, such as the drop size (and droplet size, respectively) of the printing colour to be applied or the frequency with which the drops are applied, i.e. the drop frequency (and droplet frequency, respectively). An adjustment of drying parameters (e.g. temperature, radiation intensity, air volume/air speed etc.) and/or pre-treatment parameters (e.g. charging or discharging) can also be made on a printing machine. The temperature of the ink and/or ratios between the different colours and ink applied quantity can be adjustable. The web tension and/or the synchronisation of pressure to web speed may also be adjustable. It shall be understood that the above parameters are only examples and are not exhaustive. For example, other pre-treatments and or machine type specific parameters can be taken into account.

According to a preferred embodiment of the method according to the application, the method may further comprise:
- specifying at least one substrate parameter of a substrate to be used in the printing process, in particular at least one type of substrate,
- wherein the simulation of the printing process in the simulation step is based on the specified substrate parameter.

In particular, in the case that only a specific (limited) number of different substrates out of a total number of basically possible different substrates is available for a printing process, these can be predefined for the simulation process and the at least one simulation step, respectively. If, for example, only one substrate and one type of substrate material, respectively, is available and thus only this one substrate can be used in the printing process to be carried out, this substrate can be predetermined for the simulation process. In this example, this means in particular that the substrate parameters are fixed and cannot be varied.

Alternatively or additionally, the method may comprise:
- specifying at least one printing colour parameter to be used in the printing process, in particular at least one type of printing colour,
- wherein the simulation of the printing process in the simulation step is based on the specified printing colour parameter, In particular in the case that only a specific (limited) number of different printing colours, in particular inks, out of a total number of basically possible different printing colours and types of printing colours, respectively, is available for a printing process, these can be predefined for the simulation process and the at least one simulation step, respectively. If, for example, only one ink and ink type, respectively, is available and thus only this one ink can be used in the printing process to be carried out, this can be predetermined for the simulation process. In this example, this means, in particular, that the printing colour parameters are fixed and cannot be varied.

Alternatively or additionally, the method may comprise:
specifying at least one printing machine control parameter to be used in the printing process, in particular at least one printing machine type,
wherein the simulation of the printing process in the simulation step is based on the specified printing machine control parameter.

In particular in the case that only a specific (limited) number of different printing machines out of a total number of basically possible different printing machines is available for a printing process, these can be predefined for the simulation process and the at least one simulation step, respectively. For example, if only one printing machine is available for the printing process and thus only this one printing machine can be used in the printing process to be carried out, this can be predetermined for the simulation process. In this example, this means, in particular, that printing machine control parameters can only be set and varied to the extent that is possible on the predetermined printing machine.

In a preferred embodiment, the printing machine, the substrate and the ink can be predetermined. The simulation process then determines, as parameters of the printing process parameter data set the print control parameters that promise the best (depending on the verification result) printing result on the predetermined printing machine for the predetermined substrate and the predetermined ink as well as a provided decorative target image.

According to a further embodiment of the method according to the application, an assignment to a predetermined substrate classification from a plurality of predetermined substrate classifications can be made based on the at least one predetermined substrate material parameter.

Alternatively or additionally, based on the at least one predefined printing colour parameter, an assignment to a predefined printing colour classification from a plurality of predefined printing colour classifications can be made. In particular, a data memory and database, respectively, can be provided in which a plurality of printing colour classifications are stored, each with specific printing colour parameters.

For example, such a classification can be made in advance based on available printing colours. If at least one, preferably a plurality of printing colour parameter(s), such as colourant type, pigment size, fillers, additives, colouring and/or formulation are provided, an assignment to a predetermined printing colour classification can be made, in particular, based on a comparison of the respective parameter values (in particular, the printing colour classification can be selected that comes closest to the provided at least one printing colour parameter). A similar procedure can be followed for substrate parameters. In particular, a printing process parameter data set to be used can be determined in a short time by the classification in the simulation process to be carried out subsequently.

According to a further preferred embodiment of the method according to the application, the verifying of the generated digital decorative image may comprise comparing the digital decorative image generated by the simulation step and the decorative target image. Preferably, image-image comparison techniques such as the PTS (Paper Technology Foundation) Domas software (digital optical measurement and analysis system) may be used to perform the comparison.

The at least one verification criterion may be a comparison criterion that specifies at least a specific minimum optical similarity measure (e.g. a specified target value in terms of colour location and/or colour density/optical density as well as other quality parameters, such as line sharpness, coalescence, colour bleed, resolution, gloss level, bronzing, colour matching, smooth check, skin tones and/or metamerism) between the digital decorative image generated by the simulation step and the decorative target image. In particular, the comparison criterion may be predetermined to set a specific minimum similarity to be met. For example, the minimum similarity criterion may be adjustable (by a user) between a minimum threshold and a maximum threshold (requiring e.g. identity). While setting the minimum similarity measure close to the minimum threshold value can reduce the time of the simulation process, setting the minimum similarity measure close to the maximum threshold value can improve the simulation result.

As described above, according to a preferred embodiment of the method according to the application, if the verification criterion is not met, the simulation step may be performed again. At least one parameter of the printing process parameter data set may be changed compared to the printing process parameter data set used in the previous simulation step. In particular, simulation steps can be carried out during the simulation process until the verification criterion, in particular, the comparison criterion described above is fulfilled.

According to a particularly preferred embodiment of the method according to the application, the stored historical printing data sets may comprise a plurality of stored links between, respectively, a substrate material parameter set, a printing colour parameter data set, a printing machine control data set and a decorative image printed based on the linked (data) sets, wherein the decorative image may, in particular, be stored as a digital print decorative image.

A link means in particular that a specific relationship exists between two data sets and/or individual parameters from the data sets, which is stored in the computing device. A link can, in particular, map an interaction between at least one printing machine control parameter and at least one printing colour parameter and/or at least one printing machine control parameter and at least one substrate material parameter and/or at least one printing colour parameter and at least one substrate material parameter. A relationship can be mapped by a mathematical algorithm. For example, a plurality of such relationships may be stored. For example, a relationship may be stored between a first data set (for example, a substrate material parameter set) and a second data set (for example, a printing colour parameter data set). This relationship may in turn be associated with a third data set (in the provided example, a printing machine control data set). To this, the resulting decorative image (printed in an actually executed printing step with these data sets) can be associated (in digital form). In a corresponding manner, for a plurality of data sets (substrate material parameter set, printing colour parameter data set, printing machine control data set) with at least one changed parameter each, the corresponding relationships and links can be stored.

The plurality of links may preferably be stored in the form of a machine learning module, more preferably in the form of an artificial neural network or fuzzy logic. It shall be understood that other types of machine learning modules may be used.

According to a further embodiment of the method according to the application, the digital decorative image can be generated in the simulation step based on the stored plurality of links and at least the decorative target image to be printed, preferably additionally based on at least one predetermined substrate material parameter and/or at least one predetermined printing colour parameter and/or at least one predetermined printing machine control parameter. In particular, the simulation process can be performed with a plurality of simulation steps using the machine learning module and AI module, respectively.

Furthermore, according to a further embodiment of the method according to the application, the stored plurality of links can be generated during a learning process. In particular, a plurality of printing processes can be performed and the respectively used data sets (substrate material parameter set, printing colour parameter set, printing machine control data set) and the printed decorative image can be recorded. In particular, an aforementioned machine learning module can be taught in this way.

As has already been described, according to an embodiment of the method according to the application, the stored plurality of links may be in the form of a neural network (other technologies are conceivable, such as fuzzy technology).

Preferably, the method further comprises:
 conducting the printing process in a printing step, by a printing machine, based on the output printing process parameter data set such that a printed decorative image is generated on the substrate.

In particular, a printing machine can be controlled directly by a control module of the computing device with the printing process parameter data set.

According to a preferred embodiment of the method according to the application, the method may further comprise:
 verifying the printed decorative image based on the decorative target image and at least one print quality criterion, and
 if the print quality criterion is not fulfilled, repeat the printing step,
 wherein at least one parameter of the printing process parameter data set is changed compared to the printing process parameter data set used in the previous printing step.

The verifying of the printed decorative image according to a determined printing process parameter data set can, in particular, be a comparison between the printed decorative image and the decorative target image. For example, the printed decorative image can be digitised for the verification, in particular, the comparison. Then, a comparison can be performed in the manner described above. In particular, the at least one print quality criterion may be a comparison criterion that specifies at least a specific minimum optical similarity measure (e.g. a predetermined target value with respect to colour location and/or colour density as well as further quality parameters) between said images.

If the print quality criterion is not fulfilled, the printing step can be executed again with at least one parameter of the printing process parameter data set changed in comparison to the printing process parameter data set used in the previous printing step. In addition, it can be provided that before a new printing step is carried out, a simulation process is first carried out again, in which in particular the data of the printing step carried out are additionally taken into account.

It shall be noted that, as described, the first printing result may not be of optimal quality despite a simulation process. However, the printing process parameter data set determined in the simulation process represents a more optimal starting point, so that the number of test prints is at least reduced.

According to a preferred embodiment of the method according to the application, the stored historical printing data sets (in particular, said links, in particular preferably, the machine learning module) can be updated based on the printing process parameter data set used in a printing step and the decorative image printed in the printing step. In particular, all data of a respectively conducted printing process (substrate material parameters, printing colour parameters, printing machine control parameters, printed decorative image and/or simulated digital decorative image) can be detected. With this data, the accuracy of the simulation process can be improved during operation. In particular, a feedback channel from the printing machine to the computing device can be provided. This preferably enables automatic feedback of the data and thus, in particular, learning during operation.

According to a further embodiment of the method according to the application, the method may further comprise:
 comparing the decorative target image with stored printed decorative images before performing the simulation step,
 determining the printed decorative image that has the closest similarity to the decorative target image, and
 outputting the printing process parameter data set associated with the determined printed decorative image and/or starting the simulation step based on the printing process parameter data set associated with the determined printed decorative image.

Printing processes actually carried out, in particular, the decorative images actually printed together with the respective printing process parameter data set, can preferably be recorded and, in particular, stored in a data memory. In particular, before performing a simulation step, it can be checked whether the provided and, in particular, desired decorative target image has already been printed in the past.

Preferably, a (previously described) comparison can be performed between the provided decorative target image and the stored printed decorative images. In particular, the stored decorative image with the highest similarity can be determined. In particular, if there is identity (or high similarity) between said images, the simulation process can be omitted and, in particular, the (historical) printing process parameter data set associated with the determined decorative image can be output. The printing step can then be carried out according to this printing process parameter data set.

However, if there is no identity (or high degree of similarity), preferably the execution of the simulation step can additionally be based on the printing process parameter data set of the stored decorative image with the highest similarity, in particular serve as the starting point of a simulation process.

A further aspect of the application is a computer program (product) comprising instructions which, when the computer program is executed by a processor, cause the processor to perform the method described above.

In particular, the computer program comprises software code adapted so that, when the software code is executed by a processor of a computing device, the previously described method is performed.

A still further aspect of the application is a computer-readable medium on which is stored the computer program described above.

The computer program, in particular the instructions and program instructions, respectively, can be stored on and in, respectively, a data carrier of a computing device, in particular a program memory. For example, a programme memory is a non-volatile memory such as a flash memory, a magnetic memory, an EEPROM memory (electrically erasable programmable read-only memory) and/or an optical memory.

In addition, a computing device may have a main memory, for example a volatile or non- volatile memory, in particular a random access memory (RAM), such as a static RAM memory (SRAM), a dynamic RAM memory (DRAM), a ferroelectric RAM memory (FeRAM) and/or a magnetic RAM memory (MRAM). The processor of the computing device can, for example, store intermediate results or the like in the main memory.

A still further aspect of the application is a decor printing system (in particular a decor printing system having at least one computing device), comprising:
- at least one receiving module configured to provide a decorative target image to be printed in a printing process by at least one decorative parameter data set,
- at least one simulation module configured to simulate the printing process in a simulation step, based on the provided decorative parameter data set, at least one printing process parameter data set and stored historical printing data sets, such that a digital decorative image is generated,
- at least one verification module configured to verify the generated digital decorative image based on the decorative image to be printed and at least one verification criterion, and
- at least one output module configured to output the printing process parameter data set used in the simulation step when the verification criterion is met.

As has already been described, the decor printing system may comprise at least one computing device comprising the aforementioned modules. Furthermore, at least one data memory may be provided to store the stored data (e.g. historical printing data sets, classifications, etc.). Further, the decor printing system may comprise at least one printing machine. Preferably, the printing machine may be an ink-jet printing machine.

The at least one computing device may be implemented in a back-end system (e.g. formed by one or more (distributed) servers), which may comprise the receiving module, the simulation module, the verification module and the output module. The decor printing system may be communicatively connectable to (and not itself comprise) a plurality of printing machines. As described above, in other variants, the decor printing system may also comprise these printing machines.

A module, element, etc. described above may comprise at least partial hardware elements (e.g. processor, memory means, etc.) and/or at least partial software elements (e.g. executable code).

The features of the methods, computer programs, computer-readable media and decor printing systems can be freely combined with one another. In particular, features of the description and/or of the dependent claims may be independently inventive, even by completely or partially circumventing features of the independent claims, alone or freely combined with each other.

Figure 2:
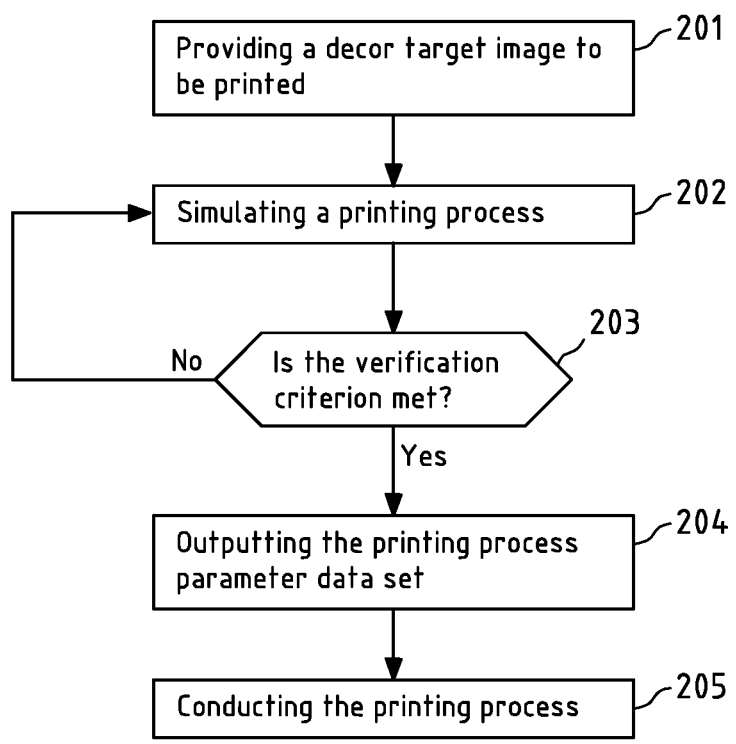
Figure 3:
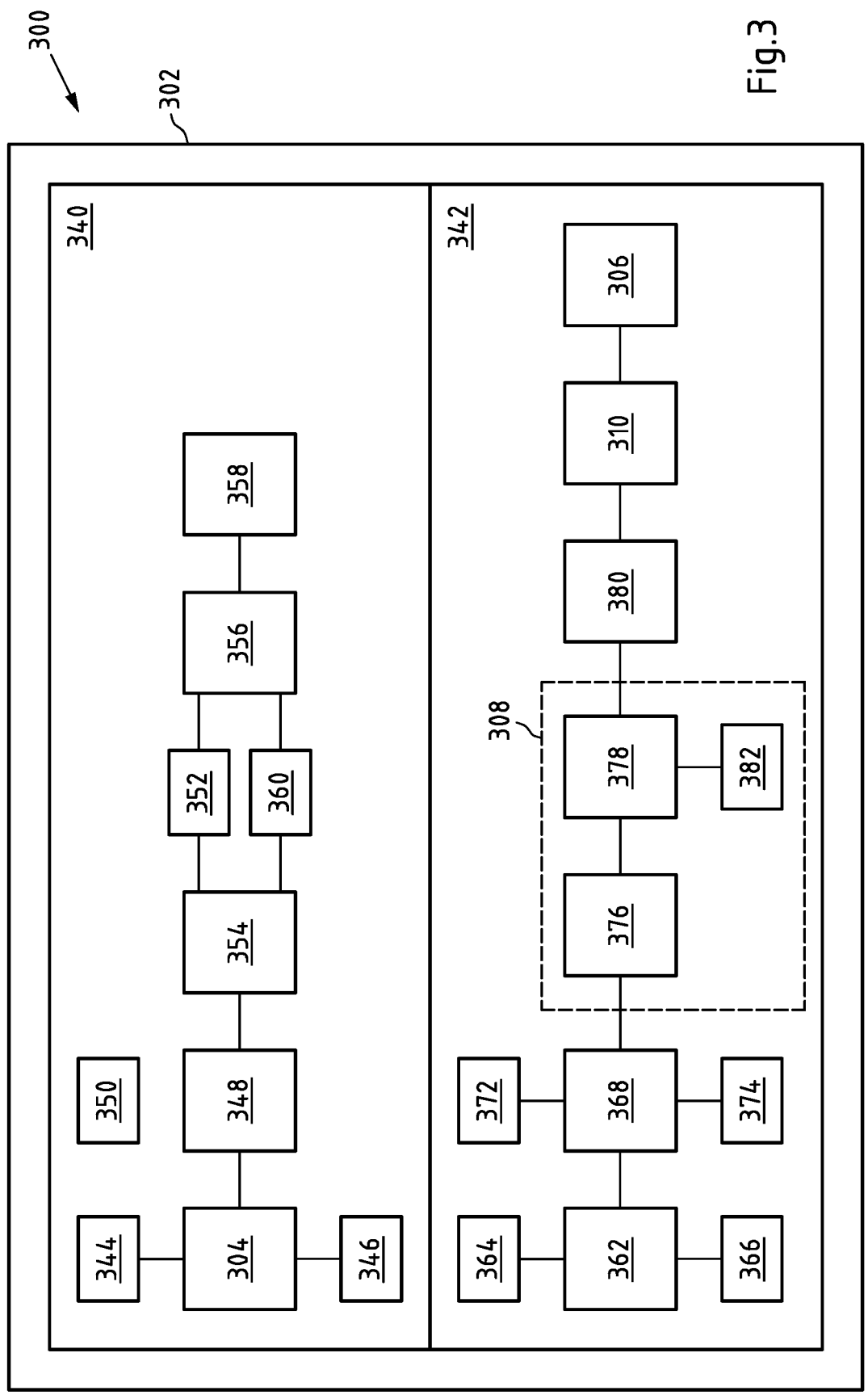

There are now a multitude of possibilities for designing and further developing the process according to the application, the computer program according to the application, the data carrier according to the application and the decor printing system according to the application. In this respect, reference is made on the one hand to the patent claims subordinate to the independent patent claims, and on the other hand to the description of embodiments in connection with the drawing. The drawing shows:

FIG. 1 a schematic view of an embodiment of a decor printing system according to the present application, FIG. 2 a diagram of an embodiment of a method according to the present application, and FIG. 3 a schematic view of an embodiment of a further decor printing system according to the present application.

In the following, the same reference signs are used for the same elements.

FIG. 1 shows a schematic view of an embodiment of a decor printing system 100 according to the present application. As can be seen, a computing device 102 and at least one printing arrangement 128 with at least one printing machine 114 are provided. The printing machine 114 may, in particular, be a digital decor printing machine 114, preferably an ink-jet printing machine 114. It shall be understood that a printing arrangement may comprise a plurality of (different) printing machines and/or a plurality of printing arrangements may be provided.

The decor printing system 100 may be formed only by the computing device 102 or, in other variants of the application, may also comprise the at least one printing arrangement 128, in particular, the at least one printing machine 114. The computing device 102 may, for example, be implemented in a back-end system 102 (formed by one or more (distributed) servers). The computing device 102 may be arranged remotely from the printing arrangement 128 and may, in particular, be connectable to the printing arrangement 128 via a communication network 112. In other variants, the computing device can also be arranged locally at the print arrangement and can be connected, for example, via a local communication network.

FIG. 1 schematically shows that the printing machine 114 can (in principle) be operated with different substrates 118, i.e. in particular different decorative raw papers 118 and decorative raw paper types 118, respectively, and different printing colours 120 and printing colour types, respectively, in particular, different inks 120. Furthermore, different printing machine control parameters 116 (for example, each between a minimum and a maximum limit value) can be set. The printing machine 114 is configured to conduct a printing step depending on a provided printing process parameter data set 122. The printing result is a printed product in the form of a substrate 124 with a printed decorative image 126. The printed product can then in turn be applied to a further carrier, as described at the beginning.

The computing device 102 may comprise a receiving module 104, an output module 106, a simulation module 108, a verification module 110 and a data memory 130. Also, a (common) bidirectional communication module may be provided to form the receiving module and the output module.

The operation of the decor printing system 100 is explained in more detail below with the aid of FIG. 2. FIG. 2 shows a diagram of an example of a method according to the present application.

In a step 201, the decorative target image to be printed in the printing process is provided by at least one decorative parameter data set. In particular, the at least one receiving module 104 is configured to provide a decorative target image 132 to be printed in a printing process by at least one decorative parameter data set. For example, the receiving module 104 may provide a decorative parameter data set 132 to the computing device 102 (for example, in the form of a file). The receiving module 104 can provide the decorative target image 132 to be printed, in particular, the corresponding decorative parameter data set, to the simulation module 108.

In a simulation step 202, the printing process is simulated based on the decorative parameter data set, at least one printing process parameter data set and stored historical printing data sets such that a digital decorative image is generated.

In particular, the at least one simulation module 108 is configured to simulate the printing process in the simulation step 202 based on the provided decorative parameter data set, at least one printing process parameter data set and stored historical printing data sets such that a digital decorative image is generated. The stored historical printing data sets may be stored, for example, in the form of a machine learning module (which may form the simulation module and/or the verification module), preferably in the form of a neural network. In this case, for example, the decorative parameter data set may be provided to the neural network as an input parameter. The neural network then provides the simulated digital decorative image and the printing process parameter data set used in the simulation as output parameters.

Preferably, further specifications can be made in the simulation step 202 and, for example, made available to the neural network as input parameters, for example, the substrates 118 and substrate material types, respectively, available for the printing process, the printing colours 120 and printing colour types, respectively, available and/or the printing machine 114 available. Since only one printing machine 114 is provided in the present example, this can be predetermined in the simulation.

The digital decorative image generated in the simulation step 202 can then be verified. In step 203, a verifying, by the verification module 110, of the generated digital decorative image occurs based on the decorative target image to be printed and at least one verification criterion. In particular, a comparison of the digital decorative image generated in the simulation step 202 and the decorative target image can be performed. If the comparison result meets the verification criterion, in particular, a comparison criterion that specifies at least a specific minimum optical similarity measure (e.g., a predetermined target value with respect to colour location and/or colour density, and other quality parameters) between the digital decorative image generated by the simulation step and the decorative target image, then it can be proceeded to step 204. In a variant, the step may be a sub-step of step 202.

In step 204, an outputting, by the output module 106, of the printing process parameter data set used in the simulation step 202 occurs for conducting the printing process if the verification in step 203 indicates that the verification criterion is met. In particular, the printing process parameter data set may be transmitted to the printing arrangement 128 and may be directly driven by the computing device 102, for example. It shall be understood that intermediate steps may be provided, such as a release of the printing process by a user.

In step 205, the printing process, in particular, the printing step, can be conducted and executed, respectively. In particular, the printing step can be performed based on the output printing process parameter data set such that a printed decorative image 126 is generated on the substrate 124. In particular, depending on the printing process parameter data set, a specified substrate (in particular, substrate material type) and a specified printing colour (in particular, printing colour type) can be used and printing machine control parameters adjustable on the printing machine 114 can be set.

If the verification criterion is not met, the simulation step 202 may be performed again with at least one parameter of the printing process parameter data set changed compared to the printing process parameter data set used in the previous simulation step. The verification result may be taken into account when performing the simulation, in particular, when changing at least one parameter. In particular, simulation steps 202 (each with changed parameters) can be carried out during the simulation process as long as until the verification criterion, in particular, the previously described comparison criterion, is fulfilled.

The method may be in the form of a computer program executable by a processor of the computing device 102.

FIG. 3 shows a schematic view of an embodiment of a further decor printing system 300 according to the present application. In order to avoid repetitions, only the differences to the embodiment according to FIG. 1 are described below and otherwise reference is made to the explanations on FIG. 1.

In particular, a computing device 302 is schematically shown which comprises hardware and software modules, wherein the software modules can, in particular, be part of the computer program (product) according to the application.

In particular, a configuration arrangement 340 and a simulation arrangement 342 may be provided. As a receiving module 304, the configuration arrangement 340 may comprise a user interface 304. In particular, the user interface 304 may be configured to allow a user/applicant to create and/or customise a specific/desired decor (image). In particular, by means of the user interface 304, the user/applicant may select the desired visual appearance via the appropriate selection of decor parameters, such as colour scheme 344 or visual texture 346.

The selection/adjustment of decor parameters detected by the user interface 304 may be provided to a first linking module 348. The linking module 348 may be configured to convert the provided selection into a (visual) decorative target image 352 and/or a corresponding decorative parameter data set by means of at least one predetermined linking rule 350. The (visual) decorative target image 352 to be printed can be displayed via a display module 354. In other variants, the decorative parameter data set can be provided directly.

Optionally, the decorative target image 352 can be provided to a first pattern recognition module 356. The pattern recognition module 356 is connected to a database 358 and a data memory 358, respectively, in which, in particular, actually printed decorative images are stored together with the respective printing process parameter data set. The pattern recognition module 356 may, in particular, be configured to perform a comparison between the decorative target image 352 and the stored printed decorative images (wherein the stored data of the database 358 may have all relevant parameters). The printed decorative image 360 with the greatest similarity to the decorative target image 352 can be determined and, in particular, displayed via display module 354.

In particular, in the event that the determined printed decorative image 360 is (almost) identical to the decorative target image 352, the printing process parameter data set associated with this decorative image 360 can be output and, in particular, used in the printing process. In particular, if there is no sufficient similarity, i.e. in particular no identity, the printing process parameter data set can optionally be taken into account in the simulation process described below.

The simulation arrangement 342 may comprise a further user interface 362 (in one variant, the same hardware user interface may be used as for the user interface 304). The further user interface 362 may be configured to specify at least one substrate material parameter (in particular, the at least one type of decorative raw paper and decorative raw paper material type, respectively, available for the printing process) and/or to specify at least one printing colour parameter (in particular, the at least one ink and type of ink, respectively, available for the printing process) and/or to specify at least one printing machine control parameter (in particular the at least one printing machine and type of printing machine, respectively, available for the printing process).

For example, an electronic selection form for entering material properties of the substrate and a selection form for entering material properties of the printing colour may be provided. Optionally, a classification module 368 may be provided.

The material properties are stored, for example, by means of a first electronic selection form, wherein the information/substrate material parameters required for describing the decorative raw paper, e.g. grammage, surface properties, composition of the ingredients, layer structure (ink-absorbing layer), pre-treatment, can be stored in a database 364, and the information/printing colour parameters required for describing the inks, e.g. colourant, pigment size, binder, fillers/additives, recipe etc., can be stored in a further database 366. It shall be understood that a data memory can be provided with different partitions for different types of data.

In a variant, the material properties can comprise a number of individual data. An optional classification module 368 can combine the paper descriptive parameters entered in the electronic selection form into a data set and assign it to a stored paper classification 372. The classification module 368 may further combine the colour descriptive parameters entered in the electronic selection form into a data set and associate the data set with a deposited colour classification 374. For example, in the event that a specific substrate and/or a specific printing colour is specified or no specifications are made for substrate and printing colour, the classification may be omitted.

Furthermore, a simulation module 308 is provided, which can be formed by a plurality of units (in other variants, however, also by only one unit, such as a machine learning module in the form of a neural network, fuzzy logic or the like). For example, a linking unit 376 and a simulation unit 378 may be provided. For example, by means of the simulation module 308, a digital decorative image can be generated by simulation from the material properties of the substrate and printing colour, which in particular comprise a desired/existing specification of the decorative raw paper, i.e. for example quality-describing parameters such as surface structures, and/or a desired/existing specification of the ink and printing colour, respectively, i.e. for example the pigment size. In particular, the digital decorative image can be displayed on a further display module 380 (this can also be module 354).

Preferably, the representation of the digital decorative image and visual appearance image, respectively, can be carried out in such a way that a concretely executable representation corresponding to reality is generated so that there is no longer any need to further detail or interpret the output information (in particular the output printing process parameter data set).

For example, the mapping of the paper descriptive data set and substrate parameter set, respectively (and the corresponding classification, respectively) to the colour descriptive data set and printing colour parameter data set, respectively (and the colour classification, respectively) may be performed by the linking unit 376. The linking unit 376 may, for example, be based on pattern recognition, fuzzy logic and/or neural network methods.

The simulation unit 378 simulates in particular the digital decorative image and visual appearance, respectively, by means of a plurality of links, in particular linking algorithms. The linking algorithms based on historical printing data describe, in particular, the mapping of the visual appearance depending on different substrate parameters and ink parameters, for example, different paper classification classes and different colour classification classes.

Furthermore, the simulation unit 378 can simulate the digital decorative image and visual appearance, respectively, by means of manufacturing linking algorithms. These manufacturing linking algorithms describe, in particular, the mapping of the decorative image and visual appearance, respectively, as a function of manufacturing and process stages and their combinatorics. The manufacturing and process stages 382 may be stored in the form of machine and control parameters 382. This means in particular that printing machine control parameter data sets can be stored.

In other words, the digital decorative image can be generated in the simulation process with at least one simulation step based on the stored plurality of links and at least the decorative target image to be printed, preferably additionally based on at least one predetermined substrate parameter and/or at least one predetermined printing colour parameter and/or at least one predetermined printing machine control parameter. In particular, as stored historical printing data sets, a plurality of stored links may be present between, respectively, a substrate parameter set, a printing colour parameter set, a printing machine control data set and a decorative image printed based on the linked data sets, which may be stored, in particular, as a digital print decorative image.

A stored digital print decorative image may be generally generated by image analysis from specifications or provided as a data set, wherein physical data such as colour densities, sharpening and others may be required.

A verification module 310 and an output module 306 are also provided.

The verification module 310 may comprise, for example, a pattern recognition unit that may compare the simulated (visual) digital decorative image with the (visual) decorative target image. In case of an unacceptable match (which may be defined in the form of at least one verification criterion), the simulation step may be repeated with at least one modified parameter (value).

The links used can be documented by each simulation step and used to update the links. The pattern recognition unit can make use of an image-to-image comparison procedure.

Subsequently, the output module 306 may be configured to output the printing process parameter data set used in the simulation step to conduct the printing process as previously described.

As already described, the printing process, in particular the at least one printing step, can be monitored and evaluated and used to optimise the historical printing data.

For example, quality data measured during the printing process can be compared with the simulation data and used for updating. In particular, a machine learning module can be continuously optimised during operation and based on conducted printing steps.

The invention claimed is:

1. A method performed by at least one computing device for controlling a printing process for printing a decorative target image onto a substrate, comprising:
   providing the decorative target image to be printed in the printing process by at least one decorative parameter data set;
   simulating the printing process in a simulation step based on the decorative parameter data set, at least one printing process parameter data set and stored historical printing data sets such that a digital decorative image is generated;
   verifying the generated digital decorative image based on the decorative target image to be printed and at least one verification criterion,
      wherein the verifying of the generated digital decorative image comprises comparing the digital decorative image generated by the simulation step and the decorative target image, and
      wherein the at least one verification criterion is a comparison criterion that specifies at least a predetermined minimum optical similarity measure between the digital decorative image generated by the simulation step and the decorative target image; and
   outputting the printing process parameter data set used in the simulation step to conduct the printing process, if the verification criterion is met.

2. The method of claim 1, wherein the printing process parameter data set comprises a substrate material parameter set and/or a printing colour parameter data set and/or a printing machine control parameter data set.

3. The method of claim 1, wherein the method further comprises:
   predetermining at least one substrate material parameter of a substrate to be used in the printing process, in particular at least one type of substrate material, wherein the simulation of the printing process in the simulation step is based on the predetermined substrate material parameter; and/or
   predetermining at least one printing colour parameter to be used in the printing process, in particular at least one type of printing colour, wherein the simulation of the printing process in the simulation step is based on the predetermined printing colour parameter; and/or
   predetermining at least one printing machine control parameter to be used in the printing process, in particular at least one printing machine type, wherein the simulation of the printing process in the simulation step is based on the predetermined printing machine control parameter.

4. The method of claim 1, wherein if the verification criterion is not met, the simulation step is executed again, wherein at least one parameter of the printing process parameter data set is changed compared to the printing process parameter data set used in the previous simulation step.

5. The method of claim 1, wherein the stored historical print data sets comprises a plurality of stored links between, respectively, a substrate parameter set, an printing colour parameter set, a printing machine control data set and a printed decorative image based on the linked data sets, wherein the printed decorative image is stored as a digital print decorative image.

6. The method of claim 5, wherein in the simulation step, the digital decorative image is generated based on the stored plurality of links and at least the decorative target image to be printed, preferably additionally based on at least one predetermined substrate parameter and/or at least one predetermined ink parameter and/or at least one predetermined printing machine control parameter.

7. The method of claim 5, wherein the stored plurality of links is generated during a learning process.

8. The method of claim 5, wherein the stored plurality of links is provided in the form of a neural network.

9. The method of claim 8, wherein the stored historical print data sets are updated based on the printing process parameter data set used in a printing step and the decorative image printed in the printing step.

10. The method of claim 1, wherein the method further comprises:
    conducting the printing process in a printing step, by a printing machine, based on the output printing process parameter data set such that a printed decorative image is generated on the substrate.

11. The method of claim 10, wherein the method further comprises:
    verifying the printed decorative image based on the decorative target image and at least one print quality criterion; and
    if the print quality criterion is not fulfilled, re-executing the printing step, wherein at least one parameter of the printing process parameter data set is changed compared to the printing process parameter data set used in the previous printing step.

12. A non-transitory computer-readable medium comprising instructions which, when the instructions are executed by a processor, cause the processor to execute the method of claim 1.

13. A decor printing system, comprising:
    at least one receiving module configured to provide a decorative target image to be printed in a printing process by at least one decorative parameter data set;
    at least one simulation module configured to simulate the printing process in a simulation step based on the provided decorative parameter data set, at least one printing process parameter data set and stored historical printing data sets such that a digital decorative image is generated;
    at least one verification module configured to verify the created digital decorative image based on the decorative image to be printed and at least one verification criterion,
       wherein the verifying of the generated digital decorative image comprises comparing the digital decorative image generated by the simulation step and the decorative target image, and
       wherein the at least one verification criterion is a comparison criterion that specifies at least a predetermined minimum optical similarity measure between the digital decorative image generated by the simulation step and the decorative target image; and
    at least one output module configured to output the printing process parameter data set used in the simulation step if the verification criterion is met.

* * * * *